(12) United States Patent
Mohns

(10) Patent No.: US 7,913,797 B1
(45) Date of Patent: Mar. 29, 2011

(54) BI-DIRECTIONAL UTILITY VEHICLE

(76) Inventor: Brad Mohns, Jackson, MN (US)

(*) Notice: Subject to any disclaimer, the term of this patent is extended or adjusted under 35 U.S.C. 154(b) by 0 days.

(21) Appl. No.: 12/628,312

(22) Filed: Dec. 1, 2009

(51) Int. Cl.
*B62D 1/02* (2006.01)

(52) U.S. Cl. ...................................... 180/326

(58) Field of Classification Search .................. 180/6.48, 180/326, 330, 331, 332
See application file for complete search history.

(56) References Cited

U.S. PATENT DOCUMENTS

| | | | |
|---|---|---|---|
| 2,329,372 A | | 9/1943 | Hitch |
| 3,223,193 A | * | 12/1965 | Reynolds et al. ............. 180/329 |
| 3,616,869 A | | 11/1971 | Rilling |
| 3,672,137 A | | 6/1972 | Hamouz |
| 3,693,744 A | | 9/1972 | Horn |
| 3,810,513 A | | 5/1974 | Spiller |
| 4,920,733 A | | 5/1990 | Berrios |
| 4,930,593 A | | 6/1990 | Swartzendruber |
| 4,967,543 A | | 11/1990 | Scag |
| 5,052,512 A | * | 10/1991 | Pakosh et al. ................. 180/329 |
| 6,679,349 B1 | * | 1/2004 | Pollish, Jr. .................... 180/326 |
| 6,915,862 B2 | | 7/2005 | Deves |
| 6,942,041 B1 | | 9/2005 | Kraus |
| 7,451,587 B2 | | 11/2008 | Komiya |
| 7,484,587 B2 | | 2/2009 | Portscheller |
| 7,748,480 B2 | * | 7/2010 | Loxterkamp et al. ........ 180/6.48 |
| 2005/0044832 A1 | | 3/2005 | Schlesser |
| 2006/0090442 A1 | | 5/2006 | Komiya |
| 2008/0295477 A1 | | 12/2008 | Porter |

* cited by examiner

*Primary Examiner* — Paul N Dickson
*Assistant Examiner* — Robert A Coker
(74) *Attorney, Agent, or Firm* — Jeffrey A. Proehl; Woods, Fuller, Shultz & Smith, PC

(57) ABSTRACT

A utility vehicle comprising a frame having a first end and a second end, at least one wheel mounted on the frame toward the first end, a pair of drive wheels being mounted on the frame toward the second end, and a drive assembly configured to rotate the drive wheels. An operator support assembly is mounted on the frame and configured to support the body of a user. The operator support assembly has at least two orientations, with a first orientation positioning an operator facing the first end and a second orientation positioning the operator on the support assembly facing the second end. A control is configured to control an aspect of operation of the vehicle. The control is mounted on the frame in a location such that the control is operable by a user seated on the operator support assembly in each of the at least two orientations.

21 Claims, 4 Drawing Sheets

BI-DIRECTIONAL UTILITY VEHICLE

BACKGROUND

1. Field

The present disclosure relates to vehicles and more particularly pertains to a new bi-directional utility vehicle providing convenient conversion of the vehicle for movement in either direction and utilization of accessories on different locations on the vehicle.

2. Description of the Prior Art

Yard maintenance machines or vehicles are generally primarily designed for forward movement in a single direction, and occasional reverse movement in an opposite direction. Accessories are either designed for towing behind the rear of the machine or are designed to be pushed in front of the vehicle, or in some cases carried below the machine.

SUMMARY

In view of the foregoing, the present disclosure describes a new bi-directional utility vehicle providing convenient conversion of the vehicle for movement in either direction and utilization of accessories on different locations on the vehicle.

In one aspect, the present disclosure relates to a utility vehicle comprising a frame having a first end and a second end, at least one wheel mounted on the frame toward the first end of the frame, a pair of drive wheels being mounted on the frame toward the second end of the frame, and a drive assembly configured to rotate the drive wheels. The vehicle further comprises an operator support assembly mounted on the frame and configured to support the body of a user. The operator support assembly has at least two orientations, with a first one of the orientations positioning an operator on the support assembly facing the first end of the frame and a second one of the orientations positioning the operator on the support assembly facing the second end of the frame. The vehicle also comprises a control configured to control an aspect of operation of the utility vehicle. The control is mounted on the frame in a location such that the control is operable by a user seated on the operator seat support assembly in each of the at least two orientations of the support assembly.

In another aspect, a utility vehicle comprises a frame having a first end and a second end, at least one wheel mounted on the frame toward the first end of the frame, a pair of drive wheels being mounted on the frame toward the second end of the frame, and a drive assembly configured to rotate the drive wheels. The vehicle further comprises an operator support assembly mounted on the frame and configured to support the body of a user. The operator support assembly is movable on the frame between two orientations, with a first one of the orientations positioning an operator on the support assembly facing the first end of the frame and a second one of the orientations positioning the operator on the support assembly facing the second end of the frame. The vehicle also comprises a control configured to control an aspect of operation of the utility vehicle. The control is mounted on the frame in a location such that the control is operable by a user seated on the operator seat support assembly in each of the at least two orientations of the support assembly. A position of the control on the frame is substantially the same in both the first orientation and the second orientation of the operator support assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
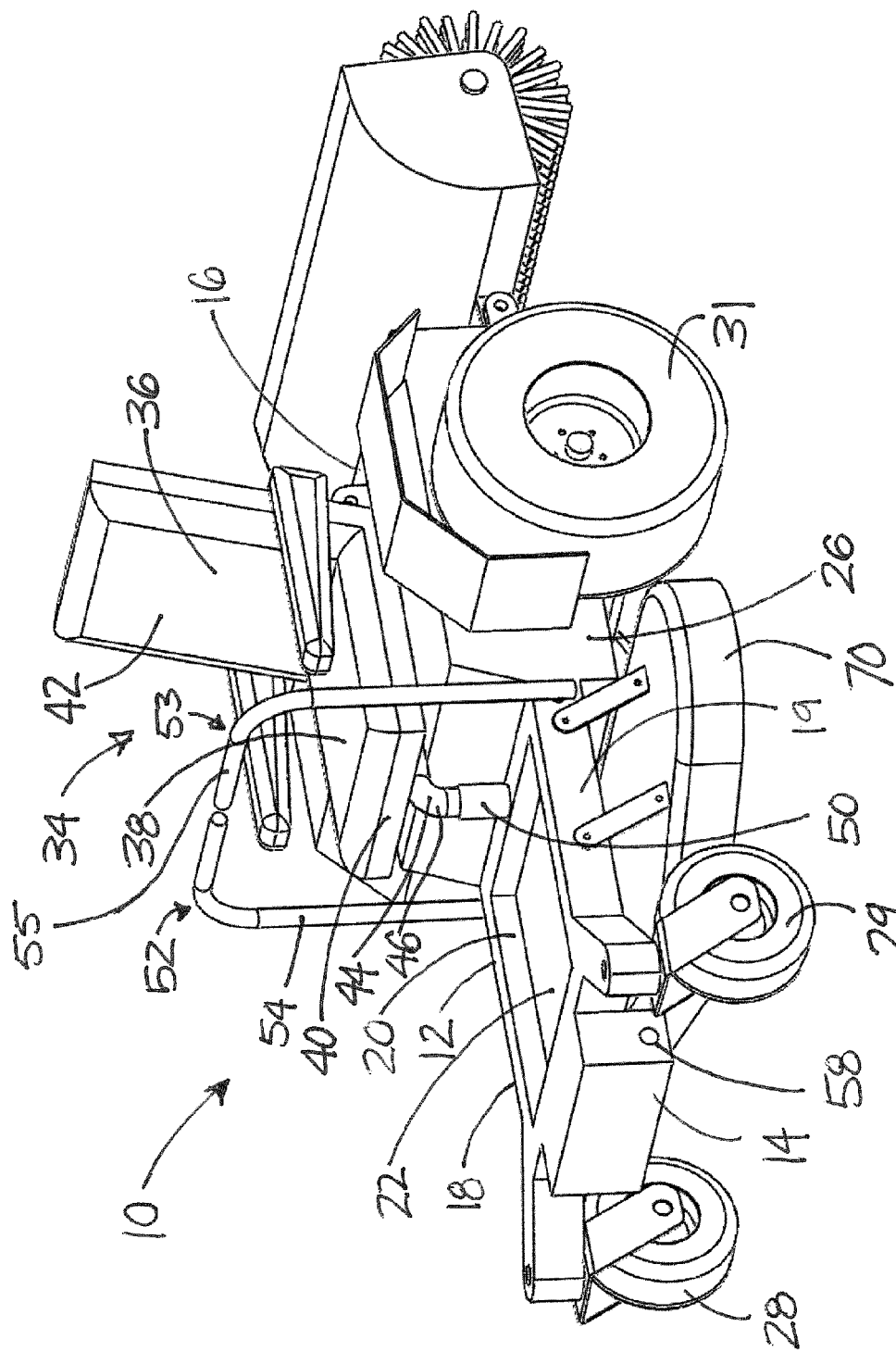
FIG. 1 is a schematic perspective view of a new bi-directional utility vehicle according to the present disclosure, showing the operator support assembly in a first orientation.

With reference now to the drawings, and in particular to FIGS. 1 through 4 thereof, a new bi-directional utility vehicle embodying the principles and concepts of the disclosed subject matter will be described.

The improvement of the present disclosure may be implemented on a mobile base, such as a utility vehicle 10 that is movable across a ground surface. The vehicle 10 may have a variety of sizes, and is especially useful for grounds maintenance tasks such as, for example, lawn mowing, sweeping, snow clearing, small scale dirt moving, and the like.

In greater detail, the utility vehicle 10 may comprise a frame 12 which may have a first end 14 and a second end 16. In some implementations, the first end of the vehicle may be considered a front of the vehicle, and the second end may be considered to be the rear of the vehicle, although it will become evident as this description proceeds that the front and rear designations are arbitrary since these labels generally indicate a normal direction of movement, and the vehicle has no normal direction of movement. The frame 12 may also have opposite sides 18, 19.

The frame 12 may further include a platform portion 20 that is positioned toward the first end 14 of the frame. The platform portion 20 may have a pair of lateral sides that generally correspond to the sides 18, 19 of the frame. Each of the lateral sides of the platform portion may be oriented substantially parallel to each other, and may comprise edges of the platform in embodiments where the platform is relatively thin in character. The platform portion 20 may have an upper surface 22, which may form a footrest for the operator of the vehicle.

The frame 12 may also include a housing portion 26 that is positioned toward the second end 16 of the frame. The housing portion 26 may define an interior in which a motor or engine may be located for moving the vehicle across the ground surface. In some embodiments, a gasoline or small diesel engine may be employed, and in other embodiments an electric motor or hybrid power plant may be utilized.

The vehicle 10 may also include at least one wheel 28, 29 that is mounted on the frame 12 toward the first end 14 of the frame, and in the most preferable embodiments a pair of wheels is employed, although this is not critical. The wheels 28, 29 may be rotatable about a substantially horizontal axis. The wheels 28, 29 may also be swivelable about a substantially vertical axis, and may be swivelable in an arc of 360 degrees so that the wheel may roll in any horizontal direction.

The vehicle 10 may also comprise a pair of drive wheels 30, 31 that are mounted on the frame 12 toward the second end 16 of the frame. Each of the drive wheels 30, 31 may be rotatable, and are capable of rotation in the same rotational direction as well as in the opposite rotational directions.

The vehicle 10 also includes a drive assembly 32 that is configured to rotate each of the drive wheels 30, 31 independently of each other, and may rotate the drive wheels in the same rotational direction to move the frame 12 across the ground surface. The drive assembly 32 may be mounted on the housing portion 26 of the frame 12, and may be located in the interior of the housing portion. The drive assembly 32 may also rotate the drive wheels 30, 31 in opposite rotational directions to steer movement of the frame 12 across the ground surface, including rotational movement about a substantially vertical axis, movement that is sometimes referred to as "zero-turn-radius" movement. The drive assembly 32 may be of virtually any of the various hydraulically-operated or mechanically-operated types of drives that produce the "zero-turn-radius" function, such as, for example, are disclosed in U.S. Pat. No. 3,616,869; U.S. Pat. No. 2,329,372; U.S. Pat. No. 4,920,733; or U.S. Pat. No. 4,967,543, each of which is incorporated herein by reference in their entireties.

The vehicle 10 may also include an operator support assembly 34 that is configured to support the body of a user and that is mounted on the frame 12. Significantly, the operator support assembly 34 may have at least two orientations for supporting the user. The first orientation (see FIG. 1) of the operator support assembly positions the operator to face toward the first end 14 of the frame 12, and the second orientation (see FIG. 2) positions the operator toward the second end 16 of the frame. The operator support assembly 34 may be movable with respect to the frame 12 to change the orientation of the operator who is supported on the support assembly 34, and in some embodiments, the operator support assembly rotates about a substantially vertical axis relative to the frame. In some implementations, the support assembly 34 may swing about the substantially vertical axis. In the first orientation, the operator seated on the support assembly 34 may be located relatively closer to the second end of the frame, and in the second orientation, the operator on the support assembly may be located relatively closer to the first end of the frame.

In some embodiments, the operator support assembly 34 includes a seat 36 for supporting a user or operator of the vehicle when the operator sits in the seat. The seat 36 may comprise a bottom support 38 which has a substantially horizontal upper surface for providing support to an operator in a vertical direction. The bottom support 38 may have a front edge 40 which may be directed or oriented toward the first end 14 of the frame 12 in the first orientation of the operator support assembly 36. The front edge 40 of the bottom support 38 may be oriented toward the second end 16 of the frame when the support assembly 34 is in the second orientation. In the illustrative embodiments, the degree of rotation between the first and second orientations is approximately 180 degrees. The seat 36 may further comprise a back support 42 that has a substantially vertical front surface that may provide support to an operator in a horizontal direction, and the operator may lean his or her back on the back support.

The operator support assembly 34 may also include a seat support 44 mounted to the frame and extending upwardly from the frame 12. The seat 36 may be mounted on the seat support 44, and the seat support may be movable with respect to the frame 12. The seat support 44 may be rotatable with respect to the frame to thereby rotate the orientation of the seat. The seat support 44 may comprise a post 46 that extends upwardly from the frame. The post may rotate about a vertical axis 48. In the illustrative embodiment, the position of the seat 36 on the post 46 of the seat support is offset so that the vertical axis 48 passes closely adjacent to the front edge 40 of the bottom support of the seat, although other orientations of the seat with respect to the axis of rotation may be employed. A socket 50 may be mounted on the frame 12 to receive a lower end of the post 46 of the seat support, and may permit rotation of the seat support 44 with respect to the frame. The seat support 44 may be wholly supported through the socket 50. The socket may be located where the platform portion and housing portion meet, although this is not critical. The post 46 may be locked against rotation with respect to the socket 50, and may be unlocked to permit rotation, using any suitable means such as for example, a spring-loaded pin and hole arrangement.

The utility vehicle 10 may include at least one control 52 that is configured to control an aspect of the operation of the vehicle. Preferably, although not critically, a pair of the controls 52, 53 may be utilized on the vehicle 10 for controlling vehicle operation. The controls 52, 53 may be mounted on the frame 12, and may be located or positioned in a location in which the controls are operable by a user seated on the operator seat support assembly 34 in both of the first and the second orientations of the support assembly. Significantly, the ability to operate the controls from both orientations avoids any need to have duplicate controls, with one set for one orientation and another set for the other orientation, which would make the vehicle more expensive and complicated to manufacture, as well as more expensive to operate as the additional weight would require greater fuel consumption. Therefore, the controls 52, 53 do not duplicate the function of each other.

The control or controls 52, 53 may be located between the location of the seat 36 of the operator support assembly 34 in the first orientation and the location of the seat in the second orientation, although this is not critical. In the illustrative embodiments, the controls 52, 53 are positioned laterally to the seat 36 and may partially extend over a portion of the seat, and may be positioned adjacent to the front edge 40 of the seat in either or both orientations. Advantageously, the controls 52, 53 may be positioned in approximately the same relationships to the seat 36 in both of the orientations of the seat to make the operation of the controls in either orientation more familiar to the user.

The controls 52, 53 may be configured to control movement of the vehicle across the ground surface. In some embodiments of the vehicle 10, the controls may provide control of the movement of the vehicle over the ground surface, such as whether the vehicle is stationary or moving, and if moving, the speed of movement. In some embodiments, the controls 52, 53 control the direction of movement, or steering, of the vehicle. In some of the most preferred embodiments, the controls 52, 53 control both the speed and the direction of movement of the vehicle.

A control lever 54, 55 may function as the respective controls 52, 53. Each of the control levers 54, 55 may be pivotable with respect to the frame 12, and may have a neutral position from which the lever is pivotable. The neutral position of the control lever 54, 55 may be substantially vertical. Each control lever 54, 55 may be pivotable toward the first end 14 of the frame 12 from the neutral position, and may be pivotable toward the second end 16 of the frame from the neutral position. The control levers may be biased into the neutral position, so that when the operator releases his or her grip from the lever, the lever returns to the neutral position.

In some embodiments, pivot movement of one of the control levers causes a drive wheel 30, 31 on a same side of the frame as the lever to be rotated in a rotational direction that tends to cause movement of the frame 12 in the direction of the pivot movement of the control lever. Illustratively, if control lever 54 is moved toward the first end of the frame, then the drive wheel 30 will be driven to rotate in a direction that tends to move the side 18 of the frame in the direction of the movement of the lever. Conversely, movement of the control lever toward the second end of the frame causes the drive wheel 30 to be rotated in a direction that tends to move the side 18 in the in the direction of the movement of the lever movement, or in a direction toward the second end. This functionality may also apply to the control lever 55 with respect to drive wheel 31 and side 19 of the frame. It will be evident that this functionality not only controls forward or rearward movement of the vehicle, but can also be used to steer the movement of the vehicle. Therefore, movement of both control levers 54, 55 toward the first end of the frame will produce movement of the vehicle 10 in the direction of the first end, and movement of both control levers toward the second end of the frame will produce movement of the vehicle 10 in the direction of the second end of the frame. Movement of the levers in different directions at the same time will cause turning of the vehicle according to the relative positions of the levers. Furthermore, the degree of movement of the control lever 54, 55 out of the neutral position may be used to control the speed at which the respective drive wheel is rotated.

At least one of the control levers 54, 55 may be pivotable in a lateral direction with respect to the frame to permit the operator support assembly 34 to move between the first and second orientations. Illustratively, one or both of the control levers may be hinged at some location along the length of the lever to permit a top portion of the lever above the hinge to swing laterally to allow the seat 36 to swing over the lever. In some embodiments of the vehicle 10, the configuration of the operator support assembly and the controls may be such that no movement of the levers is needed when the orientation of the support assembly is changed.

Figure 2:
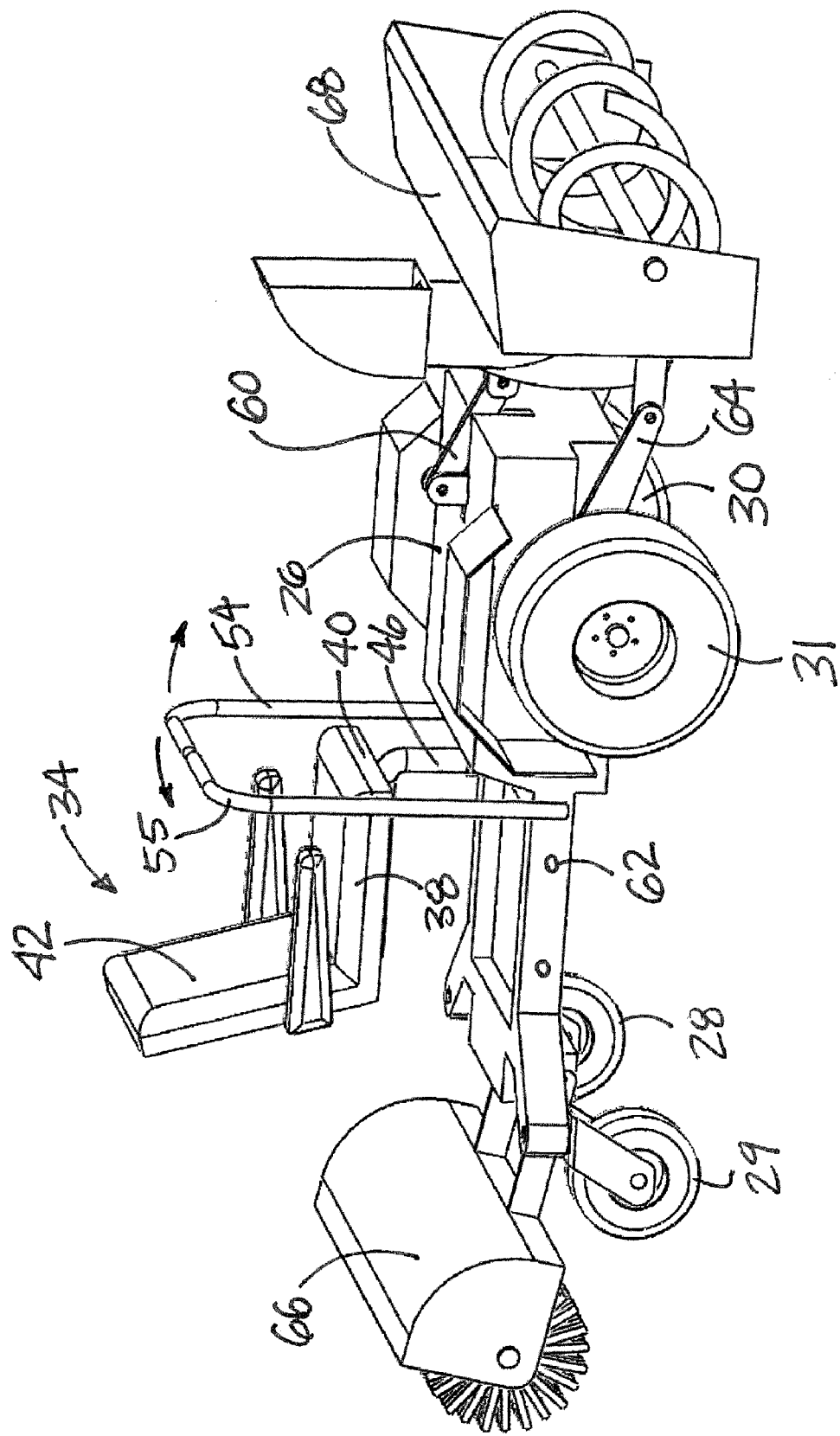
FIG. 2 is a schematic perspective view of the bi-directional utility vehicle, according to an illustrative embodiment.
Figure 3:
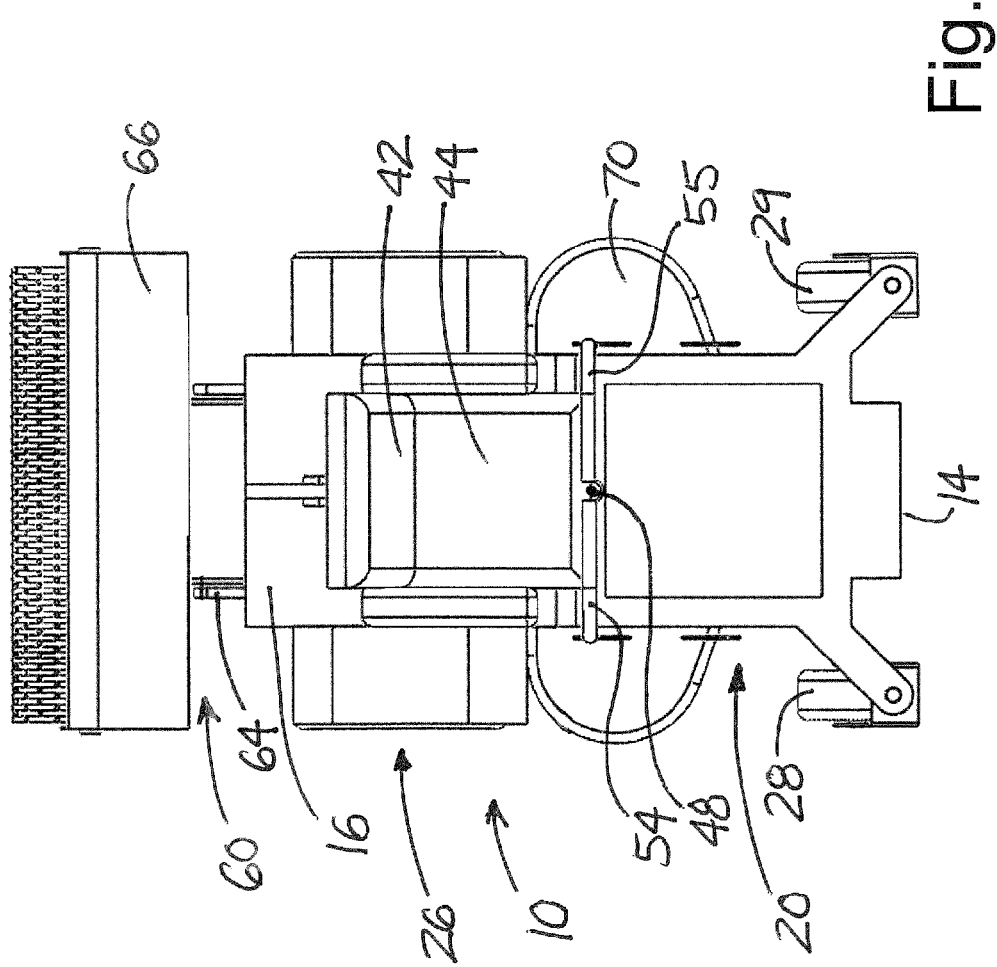
FIG. 3 is a schematic top view of the bi-directional utility vehicle, according to an illustrative embodiment.
Figure 4:
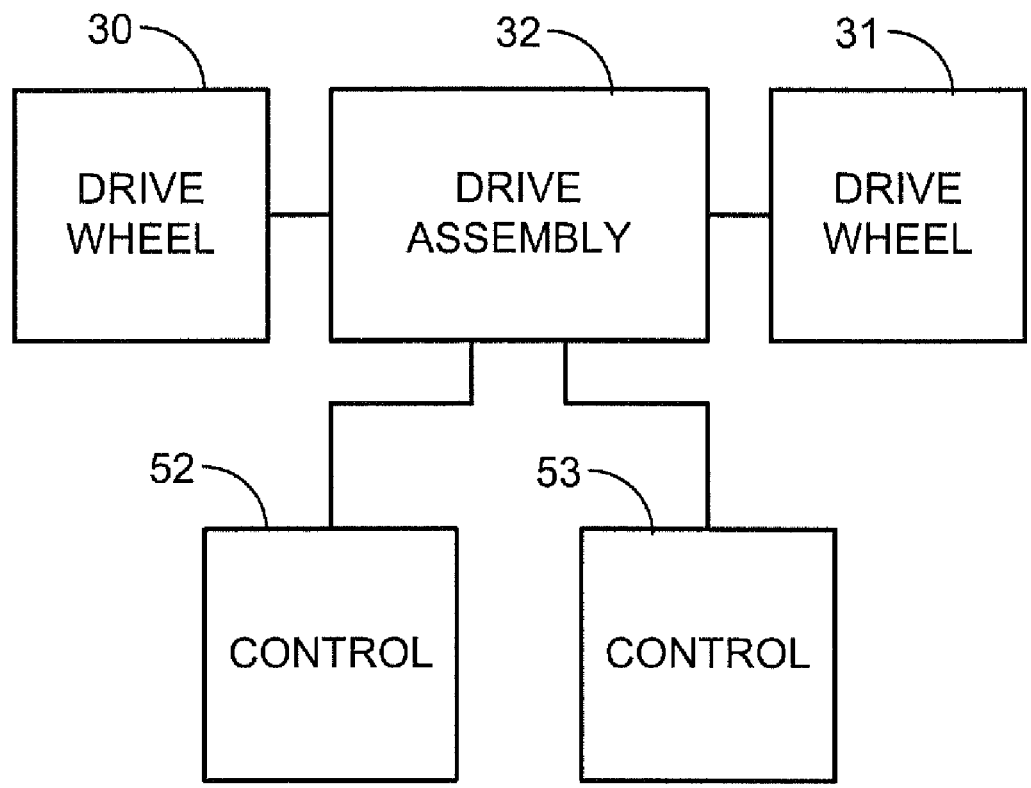
FIG. 4 is a schematic diagram of selected elements of the drive train of the utility vehicle, according to an illustrative embodiment.

The vehicle 10 may also include a first set 58 of mounting points for mounting an accessory. The first set 58 may be located on the platform portion 20 of the frame, and may be located toward the first end 14 of the frame, such that an accessory mounted on the first set 58 is located in front of the vehicle when the vehicle is moving in a direction in which the first end 14 leads. In FIG. 2, a brush accessory 66 is shown mounted on the first set 58 of mounting points in a raised position.

A second set 60 of mounting points for mounting an accessory may also be utilized on the vehicle, and may be located on the housing portion 26. The second set 60 of mounting points may be located toward the second end of the frame, such that an accessory mounted on the second set 60 is located in front of the vehicle when the vehicle is moving in a direction in which the second end 16 leads. In some embodiments, the second set 60 of mounting points may include a three point hitch comprising three arms 64 pivotally mounted on the frame. At least one of the arms may be movable by an actuator to cause movement of an accessory mounted on the three point hitch. In FIG. 1, a brush attachment 66 is shown mounted on the send set 60 of mounting points. In FIG. 2, a snow blower accessory 68 is shown mounted on the 60.

A third set 62 of mounting points may be provided for mounting an accessory, and may be located on the platform portion 20. The third set 62 of mounting points may be located on the lateral sides of the platform portion. As illustrated in FIG. 1, a mower accessory 70 may be mounted on the third set of mounting points to suspend the mower housing below the platform portion 20.

The vehicle 10 may operate as a zero turning radius lawn mower with the mower housing or deck mounted on the frame. The mower housing is removable for positioning other accessories on the vehicle for performing other tasks. A variety of accessories or attachments may be utilized on the vehicle, many on either end of the frame 12, and particularly with the provision of the three point mounting hitch. The accessories include, but are not limited to, a snow blower, a broom, a push blade, a tiller, and a log splitter. Accessories may include quick connect/disconnect structures for their mounting on the sets of mounting points, and optionally to provide power to the accessory through, for example, mechanical or hydraulic linkages with the accessory.

The positionability of the operator support assembly allows the user to operate the vehicle in forward motion relative to the operator's perspective with either of the ends 14, 16 moving forward. The operator is able to operate the controls from either orientation or perspective, without the need for a second set of duplicative controls. The operator support assembly is configured such that the operator may remain centered between the controls in either orientation of the support assembly.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A utility vehicle comprising:
   a frame having a first end and a second end;
   at least one wheel mounted on the frame toward the first end of the frame;
   a pair of drive wheels being mounted on the frame toward the second end of the frame;
   a drive assembly configured to rotate the drive wheels;
   an operator support assembly mounted on the frame and configured to support the body of a user, the operator support assembly having at least two orientations, a first one of the orientations positioning an operator on the support assembly facing the first end of the frame, a second one of the orientations positioning the operator on the support assembly facing the second end of the frame; and
   a control configured to control an aspect of a direction of movement of the utility vehicle across the ground surface, the control being mounted on the frame in a location such that the control is operable by a user seated on the operator support assembly in each of the at least two orientations of the support assembly.

2. The vehicle of claim 1 wherein a position of the control on the frame does not change when the operator support assembly is moved between the first and second orientations.

3. The vehicle of claim 1 wherein the control comprises a pair of controls both operable by a user seated on the operator seat support assembly in each of the at least two orientations of the support assembly.

4. The vehicle of claim 1 wherein the control is configured to control steering of movement of the frame across the ground surface.

5. The vehicle of claim 4 wherein the control is at least partially positioned between a location of the operator support assembly in the first orientation and a location of the seat of the operator support assembly in the second orientation.

6. The vehicle of claim 1 wherein the operator support assembly is movable with respect to the frame to change the orientation of the operator supported on the operator support assembly.

7. The vehicle of claim 1 wherein the operator support assembly is rotatable about a substantially vertical axis with respect to the frame to change the orientation of the operator supported on the operator support assembly; and
   wherein the operator support assembly includes a seat, and the substantially vertical axis does not pass through the seat such that the seat swings about the substantially vertical axis.

8. The vehicle of claim 1 wherein the operator support assembly comprises a seat, and a seat support mounted to the frame and extending upwardly from the frame, the seat being mounted on the seat support, the seat support being rotatable with respect to the frame to permit the seat to swing about a substantially vertical axis.

9. The vehicle of claim 8 wherein the operator support assembly additionally comprises a socket mounted on the frame and receiving a lower end of the seat support, the socket permitting rotation of the seat support with respect to the frame.

10. The vehicle of claim 1 wherein the control comprises a pair of control levers laterally spaced on the frame, the control levers being movable with respect to the frame from a neutral position.

11. The vehicle of claim 1 wherein the control comprises at least one control lever; and
    wherein each of the control levers is pivotable toward the first end of the frame from the neutral position and being pivotable toward the second end of the frame from the neutral position, wherein pivot movement of the control lever causes the drive wheel on a same side of the frame to rotate in a rotational direction that causes movement of the frame in the direction of the pivot movement of the control lever.

12. The vehicle of claim 1 wherein the drive assembly is configured to rotate each of the drive wheels independently of each other such that the drive wheels are rotatable in a same rotational direction and in opposite rotational directions.

13. The vehicle of claim 1 wherein the frame includes a first set of mounting points located toward the first end of the frame for removably mounting an accessory onto the frame and a second set of mounting points located toward the second end of the frame for removably mounting an accessory onto the frame.

14. The vehicle of claim 1 wherein the operator support assembly is rotatable about a substantially vertical axis with respect to the frame to change the orientation of the operator supported on the operator support assembly.

15. The vehicle of claim 1 wherein the control is at least partially positioned between a location of the operator support assembly in the first orientation and a location of the seat of the operator support assembly in the second orientation.

16. The vehicle of claim 1 wherein the control is configured to control steering of movement of the frame across the ground surface without repositioning the control when the operator support assembly is moved between the first and second orientations;
    wherein the control is at least partially positioned between the operator support assembly and the second end of the frame when the operator support assembly is in the first orientation; and
    wherein the control is at least partially positioned between the operator support assembly and the first end of the frame when the operator support assembly is in the second orientation.

17. The vehicle of claim 1 wherein the first one of the orientations of the operator support assembly positions the body of a user supported on the support assembly closer to the second end of the frame and the second one of the orientations of the operator support assembly positions the body of the user supported on the support assembly closer to the first end of the frame.

18. The vehicle of claim 1 wherein the operator support assembly includes a seat;
    wherein the control includes a pair of control levers, and
    wherein the pair of levers have locations on the frame between a position of the seat in the first orientation of the operator support assembly and a position of the seat in the second orientation of the operator support assembly.

19. A utility vehicle comprising:
    a frame having a first end and a second end;
    at least one wheel mounted on the frame toward the first end of the frame;
    a pair of drive wheels being mounted on the frame toward the second end of the frame;
    a drive assembly configured to rotate the drive wheels;
    an operator support assembly mounted on the frame and configured to support the body of a user, the operator support assembly having at least two orientations, a first one of the orientations positioning an operator on the support assembly facing the first end of the frame, a second one of the orientations positioning the operator on the support assembly facing the second end of the frame; and a control configured to control an aspect of operation of the utility vehicle, the control being mounted on the frame in a location such that the control is operable by a user seated on the operator support assembly in each of the at least two orientations of the support assembly;

wherein the at least one wheel is swivelable about a substantially vertical axis.

20. A utility vehicle comprising:

a frame having a first end and a second end;

at least one wheel mounted on the frame toward the first end of the frame;

a pair of drive wheels being mounted on the frame toward the second end of the frame;

a drive assembly configured to rotate the drive wheels;

an operator support assembly mounted on the frame and configured to support the body of a user, the operator support assembly having at least two orientations, a first one of the orientations positioning an operator on the support assembly facing the first end of the frame, a second one of the orientations positioning the operator on the support assembly facing the second end of the frame; and a control configured to control an aspect of operation of the utility vehicle, the control being mounted on the frame in a location such that the control is operable by a user seated on the operator support assembly in each of the at least two orientations of the support assembly;

wherein the frame comprises a platform portion positioned toward the first end of the frame and a housing portion positioned toward the second end of the frame.

21. A utility vehicle comprising:

a frame having a first end and a second end;

at least one wheel mounted on the frame toward the first end of the frame;

a pair of drive wheels being mounted on the frame toward the second end of the frame;

a drive assembly configured to rotate the drive wheels;

an operator support assembly mounted on the frame and configured to support the body of a user, the operator support assembly being movable on the frame between two orientations, a first one of the orientations positioning an operator on the support assembly facing the first end of the frame, a second one of the orientations positioning the operator on the support assembly facing the second end of the frame; and a control configured to control steering of movement of the frame of the utility vehicle, the control being mounted on the frame in a location such that the control is operable by a user seated on the operator support assembly in each of at least two orientations of the support assembly, a position of the control on the frame being substantially the same in both the first orientation and the second orientation of the operator support assembly.

* * * * *